(12) United States Patent
Alamin et al.

(10) Patent No.: US 8,348,030 B2
(45) Date of Patent: Jan. 8, 2013

(54) PISTON WITH IMPROVED DISPLACEMENT PROPERTIES

(75) Inventors: Amar Alamin, Tecumseh (CA); Eric J. Roszman, Farmington Hills, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 241 days.

(21) Appl. No.: 12/819,469

(22) Filed: Jun. 21, 2010

(65) Prior Publication Data

US 2011/0308904 A1 Dec. 22, 2011

(51) Int. Cl.
*B60T 11/00* (2006.01)

(52) U.S. Cl. ........................ 188/370; 188/72.4

(58) Field of Classification Search ................. 188/370, 188/72.4, 72.5, 71.1, 71.8, 73.43; 92/168, 92/172, 208
See application file for complete search history.

(56) References Cited

U.S. PATENT DOCUMENTS

| | | | | |
|---|---|---|---|---|
| 3,421,602 A * | 1/1969 | Craske | ........................ | 188/73.43 |
| 3,497,038 A * | 2/1970 | Anders et al. | .................. | 188/370 |
| 3,882,972 A * | 5/1975 | Newstead et al. | ............ | 188/72.5 |
| 4,086,985 A * | 5/1978 | Cunnell | ........................ | 188/72.4 |
| 4,189,032 A * | 2/1980 | Farr | ........................... | 188/73.44 |
| 4,193,179 A | 3/1980 | Confer et al. | | |
| 4,335,806 A * | 6/1982 | Lupertz | ........................ | 188/73.33 |
| 4,382,492 A * | 5/1983 | Ritsema | ........................ | 188/71.8 |
| 5,105,917 A * | 4/1992 | Sporzynski et al. | ........... | 188/72.4 |
| 6,637,317 B1 | 10/2003 | Zeibig et al. | | |
| 7,000,526 B2 | 2/2006 | Bennett et al. | | |
| 2003/0010027 A1 * | 1/2003 | Dangel et al. | .................... | 60/533 |

* cited by examiner

*Primary Examiner* — Robert A Siconolfi
*Assistant Examiner* — Mariano Sy
(74) *Attorney, Agent, or Firm* — Dobrusin & Thennisch PC

(57) ABSTRACT

A brake pad actuating device comprising: a piston including: a first pocket; an opposing second pocket; and an internal wall located in the piston separating the first pocket and the second pocket, wherein the volume of the first pocket to the volume of the second pocket form a ratio of less than about 20:1; and wherein the piston is adapted to be used as a brake piston.

18 Claims, 1 Drawing Sheet

PISTON WITH IMPROVED DISPLACEMENT PROPERTIES

FIELD OF THE INVENTION

The present invention generally relates to a brake piston and more particularly a piston with two open end portions.

BACKGROUND OF THE INVENTION

Typical, pistons used in a brake include one open end and one closed end. The open end faces the brake pad and the closed end is in contact with the brake fluid. When brake pressure is applied the fluid pressure increases and the fluid pushes on the closed end of the piston. The fluid moves the open end of the piston axially, with respect to a rotor, into contact with the brake pad so that the brake pad contacts the rotor and creates a braking force. The fluid pressure exerts both an axial force on the piston and a radial force on the piston. The axial forces on the piston move the piston into contact with the brake pad. Examples of such pistons are disclosed in U.S. Pat. Nos. 4,193,179; 6,637,317; and 7,000,526 all of which are expressly incorporated herein by reference for all purposes.

One disadvantage faced by these pistons is that the radial forces exerted on the closed end of the piston are relatively large. Due to the relatively large amount of radial force exerted on the closed end of the piston, the walls of the piston fail and the brake ceases to function properly. In order to avoid these failures, the walls of the piston are made relatively thick so that the piston does not fail. The added thickness of the piston walls increases the overall weight of the piston. However, the wall thickness of some pistons are not increased. These pistons are subject to an increased piston failure rate.

Another disadvantage faced by known pistons is that the choice of materials for use in creating the piston are limited. The material choice is limited to a material that is rigid so that it can withstand axial and radial forces, and it is important that the material does not degrade in brake fluid. Steel is a common choice used for making brake pistons. The steel is machined in order to create a piston, and due to the limitations in the machining process the possible configurations of the piston are limited. Alternatively, a piston may be molded out of a polymer, a thermoset, a glass fiber mold, or a reinforced thermo plastic and/or polymer. However, the wall thickness of pistons from such materials is typically thick so that the walls are rigid and can withstand both axial and radial forces. Thus, there is a need for a piston that is light, strong, resistant to failure, and does not increase the fluid displacement and/or the volume of the piston.

SUMMARY OF THE INVENTION

One possible embodiment of the present invention includes: a brake pad actuating device comprising: a piston including: a first pocket; an opposing second pocket; and an internal wall located in the piston separating the first pocket and the second pocket, wherein the volume of the first pocket to the volume of the second pocket form a ratio of less than about 20:1; and wherein the piston is adapted to be used as a brake piston.

One unique aspect of the present invention envisions a brake piston that does not include a closed end. The present inventors have identified that if the piston includes two open pockets the radial forces that act upon the open pockets may be equalized. For example, the radial forces pushing on the inside of the pocket walls may be equalized by the radial forces of the fluid pushing on the outside of the piston walls. Thus, the only forces acting upon the piston are axial forces, and piston failures may be reduced and/or eliminated. Furthermore, manufacturability of a piston that includes two open pockets may be performed easier and quicker (e.g. by reducing draft, draft angle, depth of one or more of the pockets, or a combination thereof).

Another unique aspect of the present invention envisions a reduced wall thickness. The wall thickness of the first pocket, second pocket, or both may be reduced. By reducing the thickness of the piston walls the mass of the piston may be reduced. However, the present invention may create a stiff piston so that materials may be displaced from one area to another area. For example, the wall thickness of one wall may be reduced and the wall thickness of another wall may be increased so that even stronger piston may be created. In another example, the walls of the cylindrical wall may be reduced and the internal wall may be increased; thus, reducing fluid displacement and creating a better pedal feel for the user. Accordingly, it has been identified by the present inventors that it is important to employ a particular design for pistons that makes them stronger, lighter, more resistant to failure, decreases fluid displacement, or a combination thereof.

DETAILED DESCRIPTION OF THE INVENTION

Figure 1:
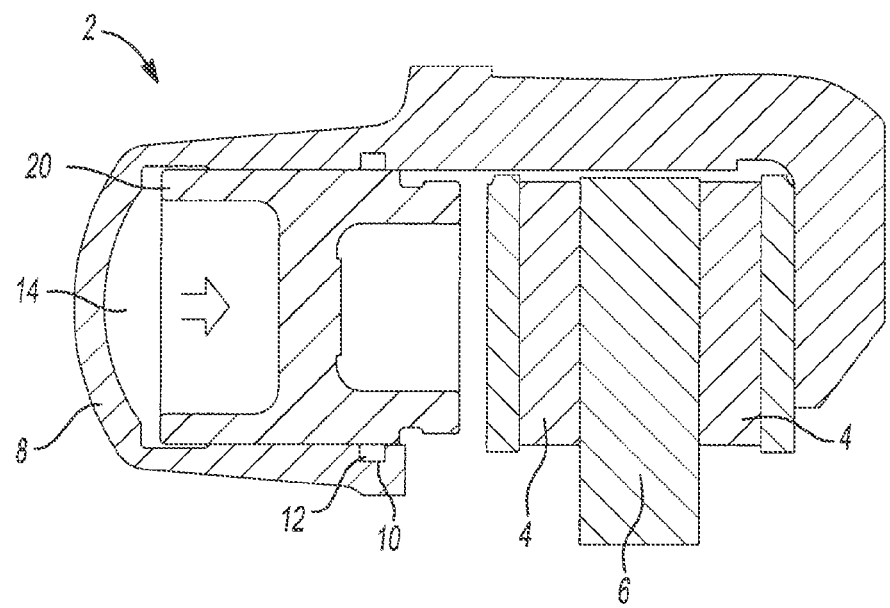
FIG. 1 illustrates one embodiment of a piston as used in a caliper.

The following description of the preferred embodiment(s) is merely exemplary in nature and is in no way intended to limit the invention, its application, or uses.

The present invention is predicated upon providing an improved disc brake system and caliper for use with vehicles. For example, the caliper and piston may be used with almost any vehicle (e.g. car, truck, bus, train, airplane, or the like). Alternatively, the caliper and piston may be integrated into components used for manufacturing or other equipment that require a brake such as a lathe, winder for paper products or cloth, amusement park rides, or the like. However, the present invention is most suitable for use with a passenger vehicle (i.e. a car, truck, sports utility vehicle, or the like).

Generally, a braking system includes a rotor and a caliper body. The caliper body includes an inboard brake pad and an outboard brake pad that are on opposing sides of the rotor. The caliper body further includes a bridge, one or more fingers, and a piston bore. The piston bore houses a piston. The piston bore may include a fluid inlet, a closed wall, a front opening, and a cylindrical side wall that includes an annular groove (i.e. seal groove) located near the front opening. A seal may be located in the annular groove and form an interference fit with the piston. The fluid inlet may be in the closed wall and may allow for fluid to enter the piston bore so that the piston is moved towards the front opening. It is also contemplated that the piston may be mechanically moved. For example, the piston may be moved by an actuator or driver. Preferably, the piston may be driven by a fluid. More preferably, the piston may be driven by a brake fluid. The front opening may allow the brake fluid to move the piston towards the front opening and into contact with a friction material (e.g. brake pad). The friction material may be axially moved into contact with the rotor so that a braking force is created.

The piston may include a body portion (e.g., sliding surface or cylindrical wall). The body portion may be any shape (e.g. square, oval, triangular) capable of sliding inside a piston bore. Preferably, the body portion is cylindrical. The body portion may have a wall thickness. The wall thickness may be any thickness that resists failure of any part of the body portion. Preferably, the thickness is thick enough that the axial forces and the radial forces applied during a brake apply do not damage the body portion of the piston.

The body portion may form the outside wall of the piston. The body portion may include a first pocket and a second pocket. The first pocket may be on a first side of the piston and the second pocket may be on a second side of the piston. The first pocket and the second pocket may be on opposing sides of the piston. The first pocket may face the bottom of the piston bore. Preferably, the first pocket may face the front opening in the piston bore. The second pocket may face the front opening in the piston bore. Preferably, the second pocket may face the bottom of the piston bore. The body portion may have a wall thickness adjacent to the first pocket and the second pocket. The thickness of the walls adjacent to the first pocket and the second pocket may be the same. The thickness of the walls adjacent to the first pocket and the second pocket may be different.

The walls adjacent to the first pocket may have a thickness. The thickness of the walls adjacent to the first pocket may be sufficiently thick so that the walls do not fail when axial forces are applied to the wall. Preferably, the thickness of the walls adjacent to the first pocket may be sufficiently thick so that the walls do not fail when radial forces are applied to the wall. More preferably, the walls adjacent to the first pocket may be sufficiently thick so that the walls can withstand the radial forces during a brake apply and so that the piston may axially move the one or more brake pads into contact with a rotor so that a braking force is created. The thickness of the walls adjacent to the first pocket may be between about 0.5 mm and 15 mm, between about 5 mm and 13 mm, or between about 8 mm and 11 mm. The thickness of the walls adjacent to the first pocket may be about 20 mm or less, about 15 mm or less, preferably about 10 mm or less.

The walls adjacent to the second pocket may have a thickness. The thickness of the walls adjacent to the second pocket may be sufficiently thick so that the walls do not fail when axial forces are applied to the wall. Preferably, the thickness of the walls adjacent to the second pocket may be sufficiently thick so that the walls do not fail when radial forces are applied to the wall. More preferably, the walls adjacent to the second pocket may be sufficiently thick so that the walls can withstand the radial forces during a brake apply and so that the piston may move the one or more brake pads into contact with a rotor so that a braking force is created. The thickness of the walls adjacent to the second pocket may be between about 0.5 mm and 15 mm, between about 3 mm and 10 mm, or between about 5 mm and 8 mm. The thickness of the walls adjacent to the second pocket may be about 20 mm or less, about 15 mm or less, preferably about 10 mm or less, or more preferably about 7 mm or less.

The body portion may have a draft angle. The draft angle may be any angle that is sufficiently large so that the piston may be removed from a mold. The draft angle of the body portion may be about 3 degrees or less, about 2 degrees or less, about 1 degree or less, or even about 0.5 degrees or less. The walls adjacent to the first pocket, the second pocket, or both may have a draft. The draft of the wall adjacent to the first pocket, the second pocket, or both may be about 2 mm or less, about 1 mm or less, preferably about 0.5 mm or less, or more preferably about 0.1 mm or less.

The first pocket and the second pocket may have a volume. The volume of the first pocket and the second pocket may be the same. The volume of the first pocket and the second pocket may be different. Preferably, the volume of the pockets will be large enough that the piston will function properly and will be resistant to failure. The volume of the first pocket may be greater than the volume of the second pocket. Preferably, the volume of the second pocket may be greater than the volume of the first pocket so that the walls adjacent to the first pocket may be thicker (e.g. greater) than the walls adjacent to the second pocket. The first pocket may have a volume of about 15 $cm^3$ or greater, about 20 $cm^3$ or greater, about 25 $cm^3$ or greater, or about 30 $cm^3$ or greater. The first pocket may have a volume of about 40 $cm^3$ or less, about 35 $cm^3$ or less, about 30 $cm^3$ or less, or even about 25 $cm^3$ or less. The volume of the first pocket may be large enough so that the piston is moved during a brake apply, but not so small that the walls of the piston fail during a brake apply. The second pocket may have a volume of about 15 $cm^3$ or greater, about 20 $cm^3$ or greater, about 25 $cm^3$ or greater, or about 30 $cm^3$ or greater. The second pocket may have a volume of about 40 $cm^3$ or less, about 35 $cm^3$ or less, about 30 $cm^3$ or less, or even about 25 $cm^3$ or less. The volume of the second pocket may be large enough so that the piston is moved during a brake apply, but not so small that the walls of the piston fail during a brake apply The first pocket and second pocket may have a volumetric ratio. The volumetric ratio of the first pocket to the second pocket may be any ratio sufficient so that during a brake apply the piston contacts the friction material and creates a braking force. Preferably, the volumetric ratio of the first pocket to the second pocket may be any ratio sufficient so that the piston does not fail during a brake apply. The volume of the first pocket to the volume of the second pocket may be about 50:1 or less, about 30:1 or less, about 25:1 or less, or even about 20:1 or less. Preferably, the volume of the first pocket to the volume of the second pocket may be about 15:1 or less, about 10:1 or less, about 5:1 or less, or even about 2:1 or less. More preferably, the volume of the first pocket to the volume of the second pocket may be about 1.5:1 or less, about 1.4:1 or less, about 1.3:1 or less, about 1.2:1 or less, or even about 1:1 or less. It is further contemplated that the second pocket may have a larger volume than the first pocket. The volume of the second pocket to the volume of the first pocket may be about 1.2:1 or greater, about 1.5:1 or greater, about 2:1 or greater, or even about 5:1 or greater.

The first pocket and the second pocket may have a depth. The depth of the first pocket and second pocket may be any depth so that any of the walls discussed herein will not fail when subjected to axial forces and/or radial forces. The depth of the first pocket and the second pocket may be substantially the same. The depth of the first pocket may be larger than the depth of the second pocket or vice versa. The depth of the first pocket may be about 5 cm or less, preferably about 4 cm or less, more preferably about 3 cm or less, and even more preferably about 2 cm or less. The depth of the second pocket may be about 5 cm or less, preferably about 4 cm or less, more preferably about 3 cm or less, and even more preferably about 2 cm or less. The depth of the first pocket and the second pocket may vary so that a larger piston may have a larger depth and a smaller piston may have a smaller depth (e.g. a truck piston versus a compact car piston). The depth of the first pocket to the depth of the second pocket may have a ratio. The ratio of the first pocket to the second pocket may be about 5:1 or less, about 4:1 or less, about 3:1 or less, about 2:1 or less, or about 1.5:1 or less. Preferably, the depth of the first pocket to the depth of the second pocket may have a ratio of about 1.3:1 or less, about 1.2:1 or less, about 1:1.2 or more, or about 1:1.3 or more. More preferably, the depth of the first pocket to the depth of the second pocket may have a ratio of about 1:1 (i.e. between about 1.2:1 and about 1:1.2).

The piston may have a length. The length of the piston may be any length suitable so that during a brake apply the piston moves into contact with a friction material and a braking force is created. The length of the piston may vary from piston to piston. For example, a truck may have a longer piston than a compact car. The length of the piston may be about 15 mm or longer. Preferably, the length of the piston may be about 25 mm or longer. More preferably, the length of the piston may be about 35 mm or longer. The piston may have a diameter. The diameter of the piston may vary from piston to piston. For example, a truck may have a piston with a larger diameter than that of a compact car. The diameter of the piston may be about 8 mm or more. Preferably, the diameter of the piston may be about 15 mm or more. More preferably, the diameter of the piston may be about 20 mm or more.

The first pocket and the second pocket may be separated by an internal wall. The internal wall may have a thickness. Preferably, the thickness of the internal wall may be thick enough so that the wall does not fail when radial forces are applied. More preferably, the thickness of the internal wall may be thick enough so that the wall does not fail when axial forces are applied. The thickness of the internal wall may be between about 0.5 mm and 15 mm, between about 5 mm and 14 mm, or between about 7 mm and 13 mm. The internal wall may form an angle with the body portion. Preferably, the internal wall may form an angle with body portion so that the internal wall, the body portion, or both are resistant to failure. The internal wall and the body portion may form about a 90 degree angle. The internal wall and the body portion may form an angle less than about 90 degrees (e.g., about 89 degrees).

The internal wall may be located anywhere along the length of the piston. Preferably, the internal wall is at a location in the piston so that when the brake pads and/or rotor are fully worn the internal wall does not extend past the seal groove, the seal, or both. The internal wall may be located in the center of the piston (i.e. the length of the first pocket and the second pocket are the same). The internal wall may be located closer to the opening of the first pocket. The internal wall may be located closer to the opening of the second pocket. The internal wall may be located at a depth relative to the first pocket and second pocket. For, example the internal wall may be located at a point in the piston so that the depth of the first pocket and the second pocket are the same (e.g. about 32 mm each). The internal wall may be located at a point that is a function of the total length of the piston minus the thickness of the internal wall. For example, the internal wall may be located at a point where the depth of the first pocket and/or second pocket is about ¼ or less of the total length of the piston (i.e. the opposite pocket is about ¾ or less of the total length of the piston). Preferably, the internal wall may be located at a point where the depth of the first pocket and/or second pocket is about 7/16 or less of the total length of the piston (i.e. the opposite pocket is about 9/16 or less of the total length of the piston). More preferably, the internal wall may be located at a point where the depth of the first pocket and/or second pocket is about ½ of the total length of the piston (i.e. the opposite pocket is about ½ of the total length of the piston).

The internal wall may be of any shape suitable for withstanding axial forces and/or radial forces during a brake apply. The internal wall may be planar. The internal wall may be flat. The internal wall may form a 90° angle with the body portion along the length and width of the internal wall. The internal wall may be convex. The internal wall may be concave. The internal wall may curve towards the first pocket. The internal wall may curve towards the second pocket.

The piston may be made of any material that is impermeable to brake fluid. The piston may be made of any material that can withstand substantial forces in the axial direction and the radial direction, relative to the rotor, so that the piston resists failures. The piston may be made of metal. For example, the piston may be made of steel, stainless steel, titanium, aluminum, carbon steel, or the like. The piston may be made of a material that may be molded or any plastic material that can be molded, so that the strength to resist radial forces and/or axial forces does not degrade in the presence of brake fluid. Preferably, the piston may be injection molded. Preferably, the piston may be made of a glass fiber mold, a thermoset polymer, a thermoplast polymer, or a combination thereof, wherein the polymeric material may be reinforced with fibers such as nylon. More preferably, the piston may be made from a phenolic resin or Acrylonitrile butadiene styrene.

A suitable material may exhibit one or more of the following properties. Preferably, a suitable material will exhibit all of the following properties. A suitable material may have a molded gravity before baking of about 0.5 or greater, preferably of about 1.0 or greater, or more preferably of about 2.0 or greater measured using ASTM D792 (i.e. between about 2.099 to about 2.112). A suitable material may have a molded gravity before baking of about 5.0 or less, preferably of about 4.0 or less, or more preferably of about 3.0 or less measured using ASTM D792. A suitable material may have a molded gravity after baking of about 0.5 or greater, preferably of about 1.0 or greater, or more preferably of about 2.0 or greater measured using ASTM D792 (i.e. between about 2.078 to about 2.091). A suitable material may have a molded gravity after baking of about 5.0 or less, preferably of about 4.0 or less, or more preferably of about 3.0 or less measured using ASTM D792.

A suitable material may have a post-baked Rockwell Hardness of about 50 E Scale or more, preferably of about 60 E Scale or more, or more preferably of about 70 E Scale or more measured using ASTM D785 (i.e. between about 104.5 and about 105.8 E Scale). A suitable material may have a post-baked Rockwell Hardness of about 200 E Scale or less, preferably of about 150 E Scale or less, or more preferably of about 125 E Scale or less measured using ASTM D785. A suitable material may have a post-baked Compressive Strength of about 150 MPa or more, preferably about 200 MPa or more, or more preferably about 250 MPa or more measured using ASTM D695 (i.e. between about 274 to about 283 MPa). A suitable material may have a post-baked Compressive Strength of about 500 MPa or less, preferably about 400 MPa or less, or more preferably about 300 MPa or less measured using ASTM D695. A suitable material may have a post-baked Tensile Strength of about 150 MPa or less, preferably about 125 MPa or less, or more preferably about 100 MPa or less measured using ASTM D695 (i.e. between about 60.7 to about 71.0 MPa). A suitable material may have a post-baked Tensile Strength of about 30 MPa or more, preferably about 40 MPa or more, or more preferably about 50 MPa or more measured using ASTM D695.

A suitable material may have a post-baked Flexural Strength of about 50 MPa or more, preferably of about 70 MPa or more, or more preferably of about 85 MPa or more measured using ASTM D790 (i.e. between about 101.1 to about 107.5 MPa). A suitable material may have a post-baked Flexural Strength of about 200 MPa or less, preferably of about 150 MPa or less, or more preferably of about 125 MPa or less measured using ASTM D790. A suitable material may have a post-baked Flexural Modulus of about 10 GPa or more, preferably of about 20 GPa or more, or more preferably of about 25 GPa or more measured using ASTM D790 (i.e. between about 23.6 to about 24.4 GPa). A suitable material may have a post-baked Flexural Modulus of about 50 GPa or less, preferably of about 40 GPa or less, or more preferably of about 30 GPa or less measured using ASTM D790. A suitable material may have a Deflection Temperature of about 200° C. or greater, preferably of about 225° C. or greater, more preferably of about 250° C. or greater measured using ASTM D648 (i.e. about 275° C. or greater).

A suitable material may have a post-baked Water Aging percentage of weight change of about 0.0005 percent or more, preferably of about 0.005 percent or more, or more preferably of about 0.01 percent or more measured using ASTM D570 for 24 hours at 22-24° C. (i.e. about 0.03 percent). A suitable material may have a post-baked Water Aging percentage of weight change of about 1.0 percent or less, preferably of about 0.5 percent or less, or more preferably of about 0.05 percent or less measured using ASTM D570 for 24 hours at 22-24° C. A suitable material may have a post-baked Water Aging percentage of volume change of about 0.0005 percent or more, preferably of about 0.005 percent or more, or more preferably of about 0.01 percent or more measured using ASTM D3604 for 24 hours at 22-24° C. (i.e. between about 0.02 and 0.06 percent). A suitable material may have a post-baked Water Aging percentage of volume change of about 2.0 percent or less, preferably of about 1.0 percent or less, or more preferably of about 0.08 percent or less measured using ASTM D3604 for 24 hours at 22-24° C.

A suitable material may have a post-baked impact strength of about 5.0 J/m or more, preferably about 10 J/m or more, or more preferably about 15 J/m or more measured using ASTM D256 (i.e. about 19.7 J/m). A suitable material may have a post-baked impact strength of about 50 J/m or less, preferably about 40 J/m or less, or more preferably about 30 J/m or less.

The piston may be placed in a cylinder bore of a caliper. The cylinder bore may include a device that mechanically pushes the piston into contact with a friction material (e.g. an actuator). Preferably, the cylinder bore includes a fluid inlet at one end and when brake pressure is applied fluid enters the cylinder bore and moves the piston axially, with respect to the rotor, into contact with a friction material. More preferably, the fluid fills the first pocket, the second pocket, or both and surrounds the first pocket, second pocket, or both so that the radial forces are offset and the axial forces move the piston into contact with the friction material. For example, if fluid fills the first pocket then it is contemplated that the fluid will also surround the first pocket. Preferably, the fluid may only fill and surround the first pocket or the second pocket. It is further contemplated that the cylinder bore may include an annular seal groove and that the annular seal groove may include a seal so that during a brake apply the seal assists in preventing fluid leakage. The force may act upon an end of the piston (e.g. an end of the first pocket, the second pocket, or both). The force may act upon the internal wall of the piston. Preferably, the force may push on the internal wall of the piston so that the piston travels axially, in relationship to the rotor, and contacts a friction material (e.g. brake pad). The force may act on the piston in a radial direction. Preferably, a radial force is applied to the inside of the body portion of the piston and a radial force is applied to the outside of the body portion of the piston so that the net force acting on the body portion in the radial direction is effectively zero.

The present invention may have a fluid displacement. The fluid displacement is the amount of fluid required to move the piston into contact with the brake pads and then push the brake pads into contact with the rotor. As the fluid moves the piston and/or brake pads the fluid may compress under the pressure. The size of the piston may affect how much fluid is required to move the piston and how much fluid is available to be compressed while the piston is being moved. For example, a larger piston diameter may require a larger volume of fluid to move the piston the same axial distance as a smaller piston.

The piston may deflect. One or more of the walls defined herein may move during a brake apply. The one or more walls may move in or out during a brake apply due to radial forces and/or axial forces. The deflection may occur at any location along the body portion of the piston. The ends of the pockets may deflect. For example, the ends of the piston adjacent to the first pocket, second pocket, or both may be pushed in or the ends may be pushed out by the radial forces of the fluid. Preferably, the radial forces will be offset so that the ends of the piston adjacent to the first pocket, second pocket, or both do not deflect. More preferably, the largest deflection of the piston may occur at the center of the piston. More preferably yet, the largest deflection of the piston may occur at the internal wall of the piston. For example, the axial forces from the fluid pressure may create a force on the internal wall and cause the internal wall to axially deflect. The walls of the piston may deflect about 0.001 mm or more, about 0.01 mm or more, or about 0.1 mm or more under about 35 MPa of pressure. The walls of the piston may deflect about 1.0 mm or less, preferably about 0.75 mm or less, or more preferably about 0.4 mm or less (e.g. between about 0.15 to about 0.25 mm).

The mass of the piston may be reduced. The mass of the piston may be reduced by any suitable amount so that the piston is resistant to failure. The mass of the piston may be reduced by about 5 percent or more, by about 8 percent or more, or even by about 11 percent or more (i.e. about 12.8 percent). The overall mass of the piston may be reduced by about 10 grams or more, by about 15 grams or more, or even about 20 grams or more (i.e. about 23.7 grams).

FIG. 1 illustrates a cross-sectional plan view of one embodiment of the present invention as used with a caliper 2. The caliper 2 includes a piston bore 8 that houses the piston 20. The piston bore 8 further includes an annular groove 10 that includes a seal 12. The piston 20 may be moved by a fluid 14 that is introduced into the piston bore 8 during a brake apply. The fluid 14 may move the piston 20 axially into contact with a brake pad 4, as is indicated by an arrow, and then both the piston 20 and brake pad 4 may be moved axially towards a rotor 6 so that the brake pads 4 contact the rotor 6 and create a braking force as is illustrated in FIG. 1.

Figure 2:
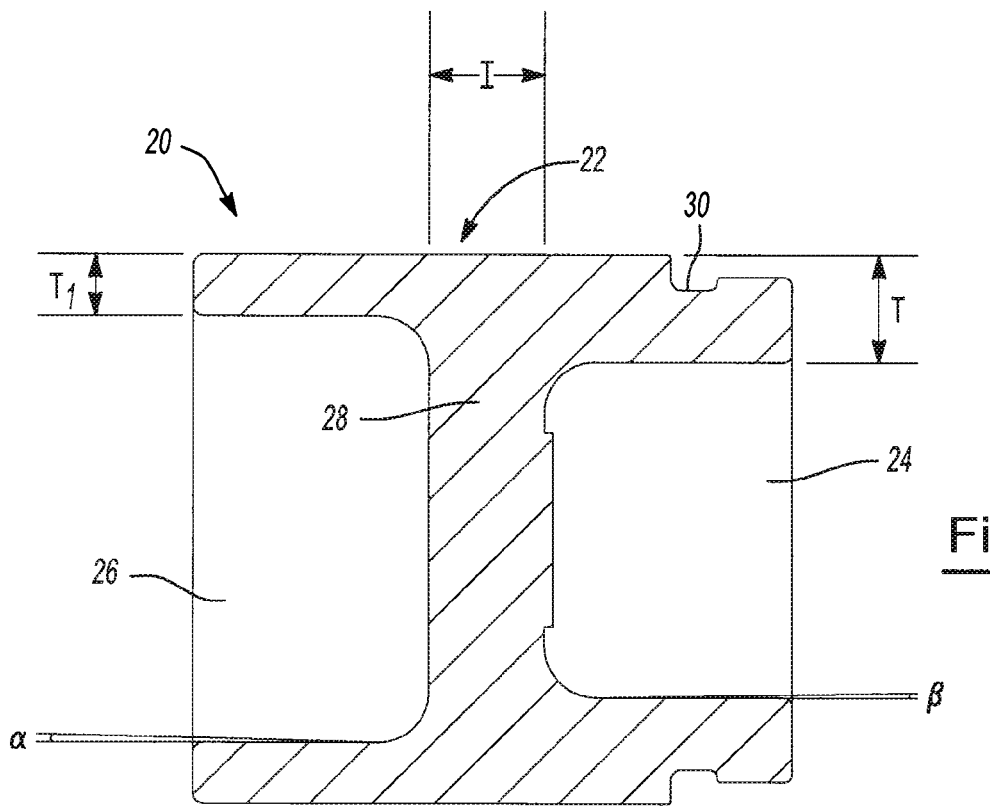
FIG. 2 illustrates a cross-sectional plan view of one embodiment of a piston.

FIG. 2 illustrates a cross-sectional plan view of one embodiment of the present invention. The piston 20 includes a body portion 22. The body portion 22 includes a first pocket 24 at a first end and a second pocket 26 at a second end. The first pocket 24 and the second pocket 26 are separated by an internal wall 28. The body portion 22 may further include a boot groove 30. The body portion 22 has a wall thickness (T) near the first pocket 24 and a wall thickness (T1) near the second pocket 26. The internal wall 28 may have a thickness (I). The first pocket 24 may have a first draft angle ($\beta$), and the second pocket 26 may have a second draft angle ($\alpha$).

In one possible embodiment, the piston may have a volume of the first pocket to the volume of the second pocket form a ratio of less than about 10:1; the volume of the first pocket to the volume of the second pocket form a ratio of between about 5:1 to about 1:1; the volume of the first pocket to the volume of the second pocket form a ratio of between about 2:1 to about 1:2; the piston is made of a moldable plastic material that does not dissolve in brake fluid; the piston is sufficiently rigid to withstand fluid pressure that pushes the piston into contact with an inboard brake pad; the fluid fills the second pocket and surrounds a sliding surface of the second pocket so that pressure is only exerted axially in relationship to the piston; substantially equal amounts of force, in the radial direction, are exerted on the inside of the second pocket wall and the outside of the second pocket wall; pressure is exerted on the piston, and substantially all of the pressure is exerted axially on the internal wall; the internal wall of the piston is located in proximity to a seal groove when the piston is fully worn, and the piston is in a fully extended position; the internal wall does not travel past a seal groove when pressure is applied to the piston; the wall thickness of the second pocket of the piston is reduced resulting in reduced piston mass; the wall thickness of the second pocket of the piston is held constant and the inner wall thickness is increased resulting in a lower fluid displacement; the wall thickness of the second pocket of the piston is reduced and the inner wall thickness is increased resulting in lower fluid displacement and unchanged mass; the wall thickness of the first pocket is thicker than the wall thickness of the second pocket; the draft angle of the second pocket and the first pocket are reduced; the piston is made of a phenolic resin; the piston is made of Acrylonitrile butadiene styrene (ABS); the piston is injection molded; the internal wall is located between the first pocket and the second pocket so that the depth of both the first pocket and the second pocket are substantially the same; and the piston does not include a closed end.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'sx' parts by weight of the resulting polymeric blend composition" also contemplates a teaching of ranges of same recited amount of "x" in percent by weight of the resulting polymeric blend composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A brake pad actuating device comprising:
    a) a piston including:
        i) a first pocket;
        ii) an opposing second pocket; and
        iii) an internal wall located in the piston separating the first pocket and the second pocket,
        wherein a volume of the first pocket to a volume of the second pocket form a ratio of about 10:1 or less; and
        wherein the piston is made of a moldable plastic material that does not dissolve in brake fluid, and the piston is adapted to be used as a brake piston; and
        wherein a depth of the first pocket and a depth of the second pocket form a ratio of between about 1.2:1 and about 1:1.2 and a wall thickness of the internal wall between about 5 mm and 14 mm.

2. The brake pad actuating device of claim 1, wherein the volume of the first pocket to the volume of the second pocket form a ratio of between about 5:1 to about 1:1.

3. The brake pad actuating device of claim 1, wherein the volume of the first pocket to the volume of the second pocket form a ratio of between about 2:1 to about 1:2.

4. The brake pad actuating device of claim 1 wherein fluid fills the second pocket and surrounds a sliding surface of the second pocket so that pressure is only exerted axially in relationship to the piston.

5. The brake pad actuating device of claim 1 wherein substantially equal amount of force, in a radial direction, are exerted on the inside of the second pocket wall and the outside of the second pocket wall.

6. The brake pad actuating device of claim 1, wherein the brake pad actuating device includes a piston bore that houses the piston, the piston bore including a seal groove;
    wherein the internal wall of the piston is located proximate to the seal groove when the brake pads are fully worn, and the piston is in a fully extended position 7. The brake pad actuating device of claim 1, wherein the brake pad actuating device includes a piston bore that houses the piston, the piston bore including a seal groove;

wherein the internal wall does not travel past the seal groove when pressure is applied to the piston.

8. The brake pad actuating device of claim 1, wherein a wall thickness of the second pocket of the piston is between about 5 mm and about 8.

9. The pad actuating device of claim 1, wherein a wall thickness of the second pocket is reduced and the internal wall thickness is increased resulting in lower fluid displacement and unchanged mass.

10. The brake pad actuating device of claim 1, wherein a wall thickness of the first pocket is greater than a wall thickness of the second pocket.

11. The brake pad actuating device of claim 1, wherein a draft angle of the second pocket and the first pocket are reduced.

12. The brake pad actuating device of claim 1, wherein the piston is made of a phenolic resin or Acrylonitrile butadiene styrene (ABS).

13. The brake pad actuating device of claim 1, wherein the internal wall is located between the first pocket and the second pocket so that the depth of both the first pocket and the second pocket are substantially the same.

14. The brake pad actuating device of claim 1, wherein the piston is free of a closed end.

15. The brake pad actuating device of claim 1, wherein the moldable plastic material has a post-baked Rock-well hardness of about 70 E scale or more measured using ASTM D785.

16. The brake pad actuating device of claim 15, wherein the moldable plastic material has a post-baked compressive strength of about 150 MPa or more measured using ASTM D695.

17. The brake pad actuating device of claim 15, wherein the moldable plastic material has a post-baked impact strength of about 5.0 J/m or more measured using ASTM D256.

18. A brake pad actuating device comprising:
a) a cylindrical piston adapted for use as a brake piston, the cylindrical piston consisting essentially of:
  i) a first pocket;
  ii) an opposing second pocket;
  iii) an internal wall located in the piston separating the first pocket and the second pocket; and
  iv) an annular boot groove located in the cylindrical piston adjacent to the first pocket;
b) a piston bore that houses the piston, the piston bore including a seal groove;
wherein a volume of the first pocket to a volume of the second pocket form a ratio of about 1.5:1 or less;
wherein the internal wall is located between the first pocket and the second pocket so that a depth of both the first pocket and the second pocket are substantially the same;
wherein the cylindrical piston is made of a moldable plastic material that does not dissolve in brake fluid, and the cylindrical piston is sufficiently rigid to withstand fluid pressure that pushes the cylindrical piston into contact with an inboard brake pad;
wherein brake fluid fills the second pocket and surrounds the second pocket of the cylindrical piston so that equal amounts of force, in a radial direction, are exerted on an inside of the second pocket of the cylindrical piston and an outside of the second pocket of the cylindrical piston; and
wherein the moldable plastic material has a post-baked flexural strength of about 85 or more measured using ASTM D 790.

* * * * *

UNITED STATES PATENT AND TRADEMARK OFFICE
CERTIFICATE OF CORRECTION

PATENT NO. : 8,348,030 B2
APPLICATION NO. : 12/819469
DATED : January 8, 2013
INVENTOR(S) : Amar Alamin Page 1 of 1

It is certified that error appears in the above-identified patent and that said Letters Patent is hereby corrected as shown below:

Col. 10, Line 46, Claim 1, after "internal wall" please insert --of the piston is--

Signed and Sealed this
Fifth Day of March, 2013

Teresa Stanek Rea
*Acting Director of the United States Patent and Trademark Office*